US008903303B1

(12) United States Patent
Garavito

(10) Patent No.: US 8,903,303 B1
(45) Date of Patent: Dec. 2, 2014

(54) BOOK WITH PADDED COVERS AND PAGES

(76) Inventor: Marlene Garavito, Deerfield Beach, FL (US)

(*) Notice: Subject to any disclaimer, the term of this patent is extended or adjusted under 35 U.S.C. 154(b) by 105 days.

(21) Appl. No.: 13/542,927

(22) Filed: Jul. 6, 2012

(51) Int. Cl.
*G09B 5/06* (2006.01)
*B42D 1/00* (2006.01)

(52) U.S. Cl.
CPC .................................... *B42D 1/00* (2013.01)
USPC .......................................... 434/317; 281/29

(58) Field of Classification Search
CPC ......... G09B 17/006; G09B 5/06; G09B 5/062
USPC .......................................... 434/317; 281/29
See application file for complete search history.

(56) References Cited

U.S. PATENT DOCUMENTS 4,853,994 A 8/1989 Ekstein
4,874,340 A 10/1989 Smallwood
5,538,430 A 7/1996 Smith et al.
5,713,741 A 2/1998 DeMars
5,765,245 A 6/1998 Breto
5,819,346 A 10/1998 Lane
6,513,164 B1 2/2003 Hearns
D551,704 S 9/2007 Nakamura
7,380,298 B2 6/2008 Hernandez
7,486,197 B1 2/2009 Frazier et al.
2007/0061975 A1* 3/2007 Hernandez ........................ 5/639
2007/0174969 A1* 8/2007 Nakamura ........................ 5/640
2008/0211222 A1* 9/2008 Nakamura ...................... 281/31

* cited by examiner

*Primary Examiner* — Robert J Utama
*Assistant Examiner* — Robert P Bullington

(57) ABSTRACT

An interchangeable story pillow book system having audio content playback has a book core structure having a spine member, a front cover member, a back cover member, a first page member, and a second page member. The book core structure resembles a book having pages. The system has an audio recording and output system having a microprocessor, a speaker, a microphone, a data storage component, a plurality of activation switches, a power source, and a data interface component. The system has a padded multi-page book sheath having a front cover sheath, a back cover sheath, a first page sheath, and a second page sheath. The book sheath is located over and onto the book core structure.

1 Claim, 6 Drawing Sheets

BOOK WITH PADDED COVERS AND PAGES

BACKGROUND OF THE INVENTION

Early reader story books for small children have been around for a long time. Variations on these children's books include waterproof books that can be taken into a bath tub or soft books that will not poke or cut the child when they hold onto it or contact it in any way. Further, the book must be durable to withstand the destructive nature of some children. Because children often fall asleep spontaneously, soft books and other toys are desirable to ensure that the child does not harm himself whenever he lies down. The present invention teaches a soft, padded, story book with audio recording and playback capability and further features an interchangeable story sheath.

SUMMARY

The present invention features an interchangeable story pillow book system of sufficient thickness, smoothness, and softness for sleeping, having recorded or prerecorded audio content playback. In some embodiments, the present invention features a single story pillow book system of sufficient thickness, smoothness, and softness for sleeping, having recorded or prerecorded audio content playback. In some embodiments the system comprises not more than four page members.

In some embodiments the system comprises a book core structure comprising a spine member, a front cover member, a back cover member, a first page member, and a second page member. In some embodiments, the book core structure resembles a book having pages. In some embodiments, the system comprises an audio recording and output system comprising a microprocessor, a speaker, a microphone, a data storage component, a plurality of activation switches, a power source, and a data interface component.

In some embodiments, the system comprises a padded multi-page book sheath comprising a front cover sheath, a back cover sheath, a first page sheath, and a second page sheath. In some embodiments, a book sheath data storage component is operatively connected to a book sheath data interface component and are together located at an intersection of a front cover sheath attachment edge, a back cover sheath attachment edge, a first page sheath attachment edge and a second page sheath attachment edge.

In some embodiments, the book sheath is located over and onto the book core structure. In some embodiments, the book sheath is held into place by a spine attachment component located on a front cover sheath front surface and a back cover sheath back surface. In some embodiments, the book sheath data interface component operatively attaches to the data interface component upon installation of the book sheath.

In some embodiments, the system comprises a closure tab having a free closure tab first end and a closure tab second end located on the back cover free edge. In some embodiments, the closure tab first end comprises an attachment component first side located on it. In some embodiments, the front cover sheath front surface comprises an attachment component second side located on it. In some embodiments, upon closing the pillow book system, the attachment component first side attaches to the attachment component second side.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
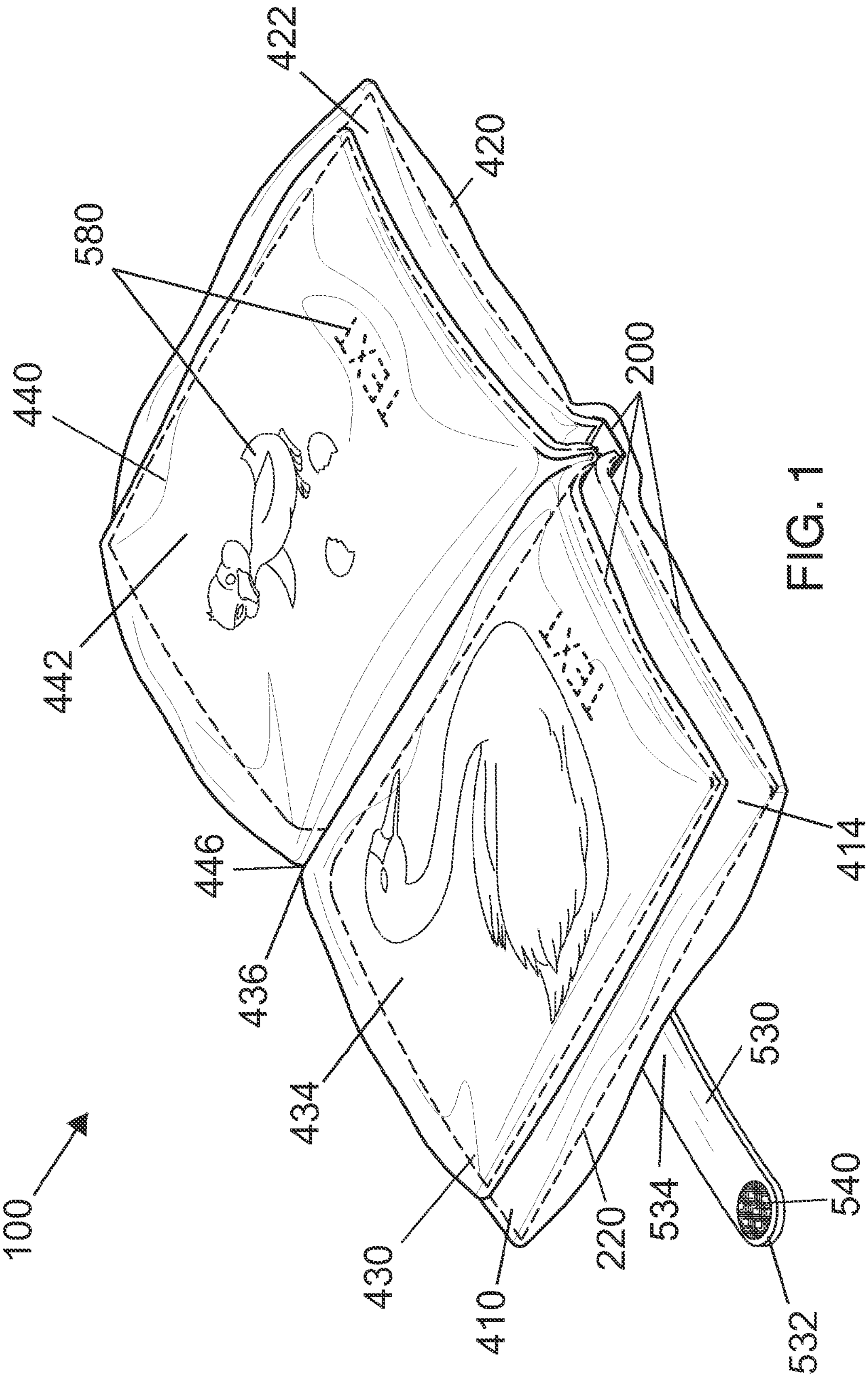
FIG. 1 is a perspective view of the present invention.
Figure 1A:
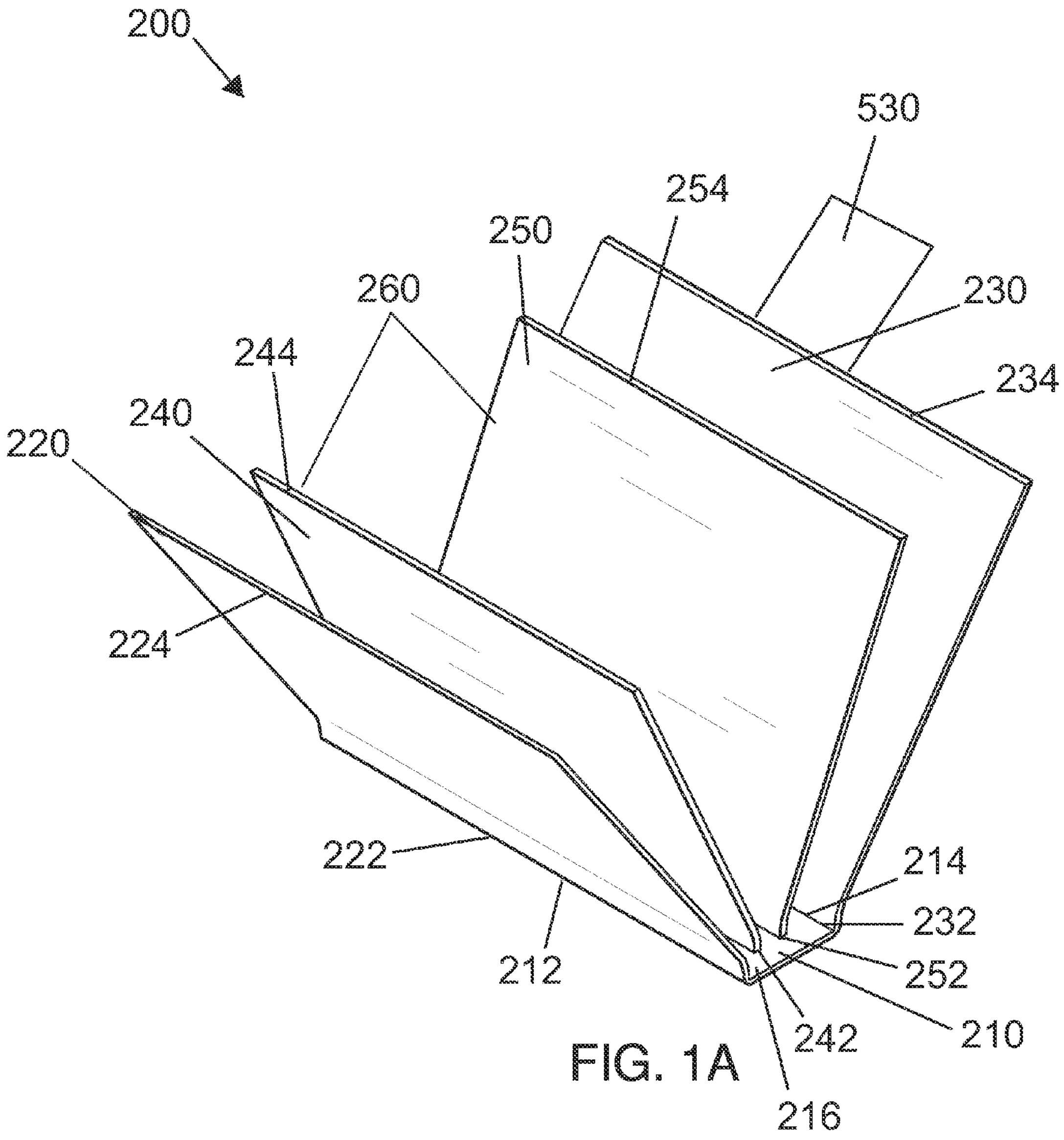
FIG. 1A is a perspective view of the book core structure of the present invention.

Following is a list of elements corresponding to a particular element referred to herein:

100 Pillow book system
200 Book core structure
210 Spine member
212 Spine front cover edge
214 Spine back cover edge
216 Spine interior surface
220 Front cover member
222 Front cover attachment edge
224 Front cover free edge
230 Back cover member
232 Back cover attachment edge
234 Back cover free edge
240 First page member
242 First page attachment edge
244 First page free edge
250 Second page member
252 Second page attachment edge
254 Second page free edge
260 Page member
300 Audio recording and output system
310 Microprocessor
320 Speaker
330 Microphone
340 Data storage component
350 Activation switch
360 Power source
370 Data interface component
400 Book sheath
410 Front cover sheath
412 Front cover sheath front surface
414 Front cover sheath back surface
416 Front cover sheath attachment edge
420 Back cover sheath
422 Back cover sheath front surface
424 Back cover sheath back surface
426 Back cover sheath attachment edge
430 First page sheath
432 First page sheath front surface
434 First page sheath back surface
436 First page sheath attachment edge
440 Second page sheath
442 Second page sheath front surface
444 Second page sheath back surface
446 Second page sheath attachment edge
450 Page sheath
500 Book sheath data storage component

Figure 2:
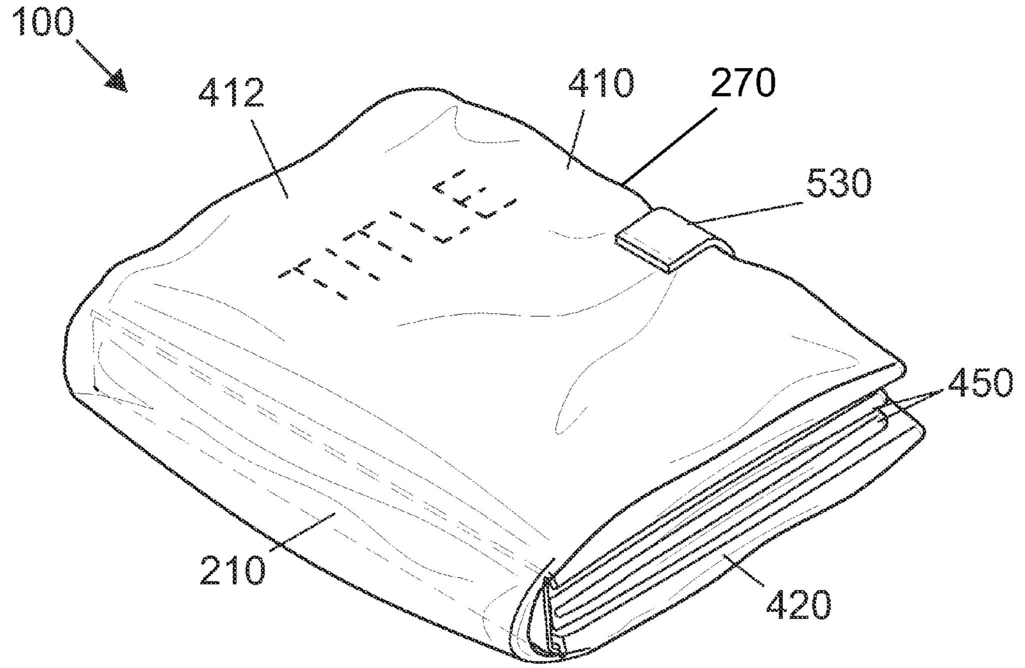
FIG. 2 is a perspective view of the present invention.
Figure 3:
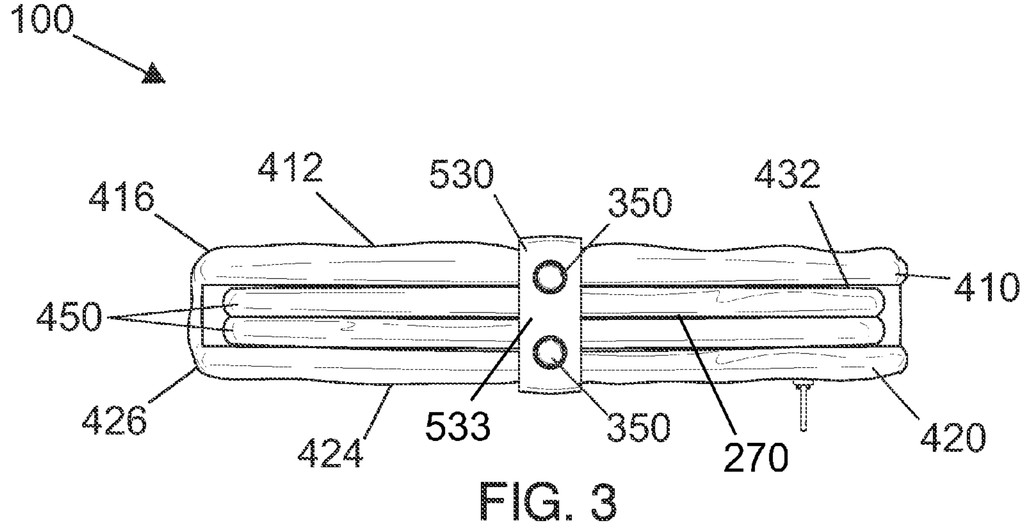
FIG. 3 is a side view of the present invention.
Figure 4:
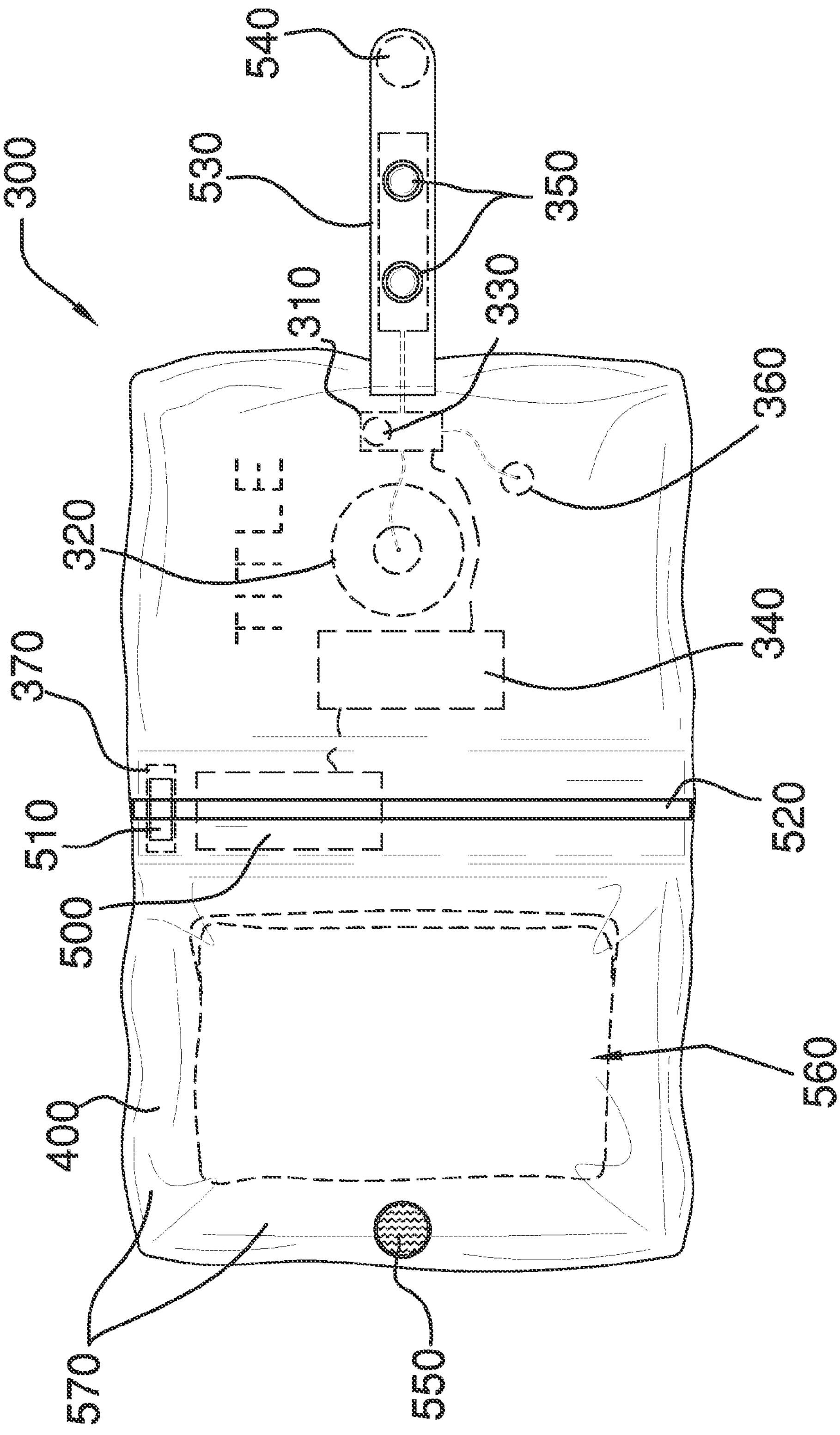
FIG. 4 is a back view of the present invention.
Figure 5:
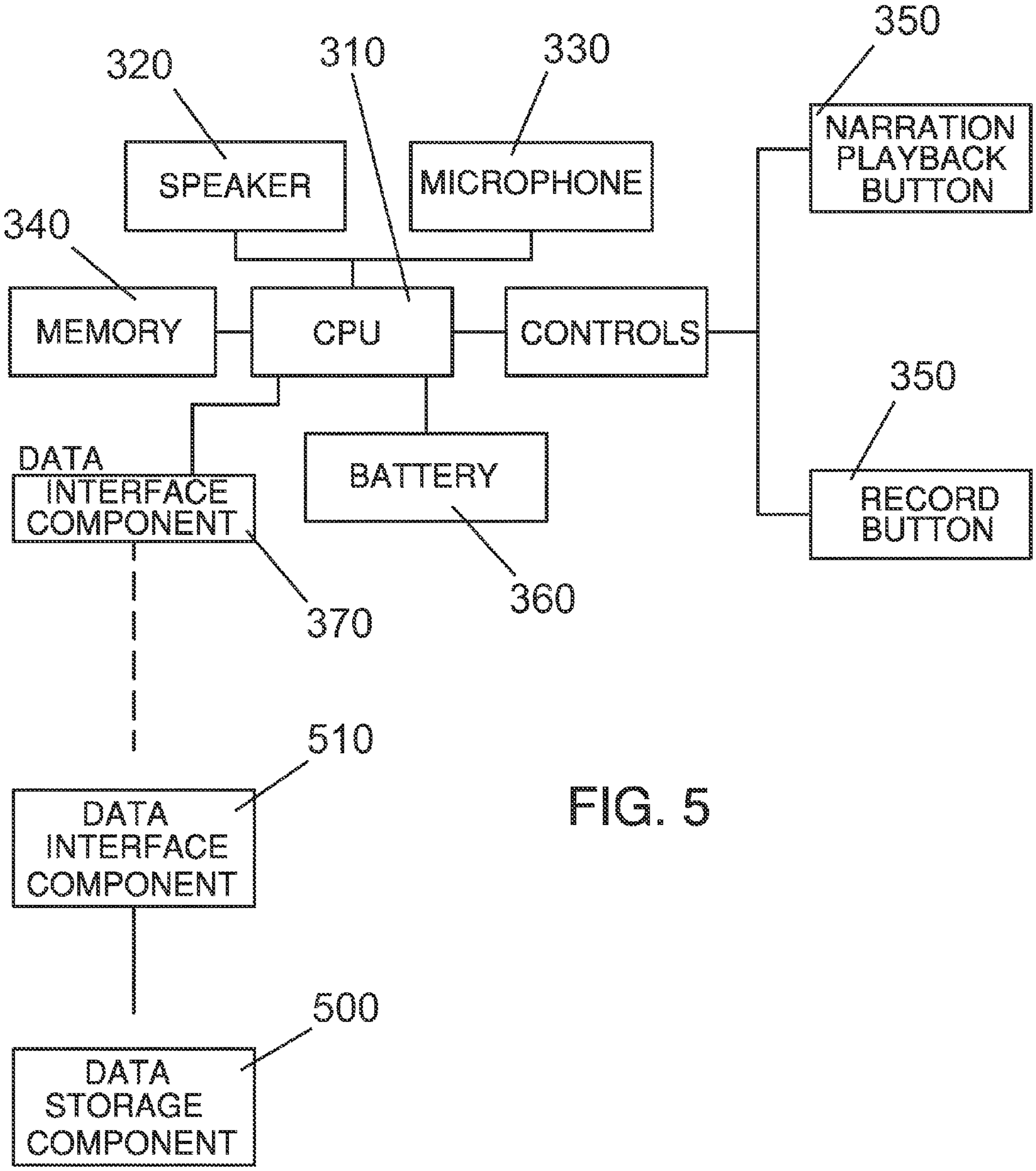
FIG. 5 is a schematic view of the present invention.
Figure 6:
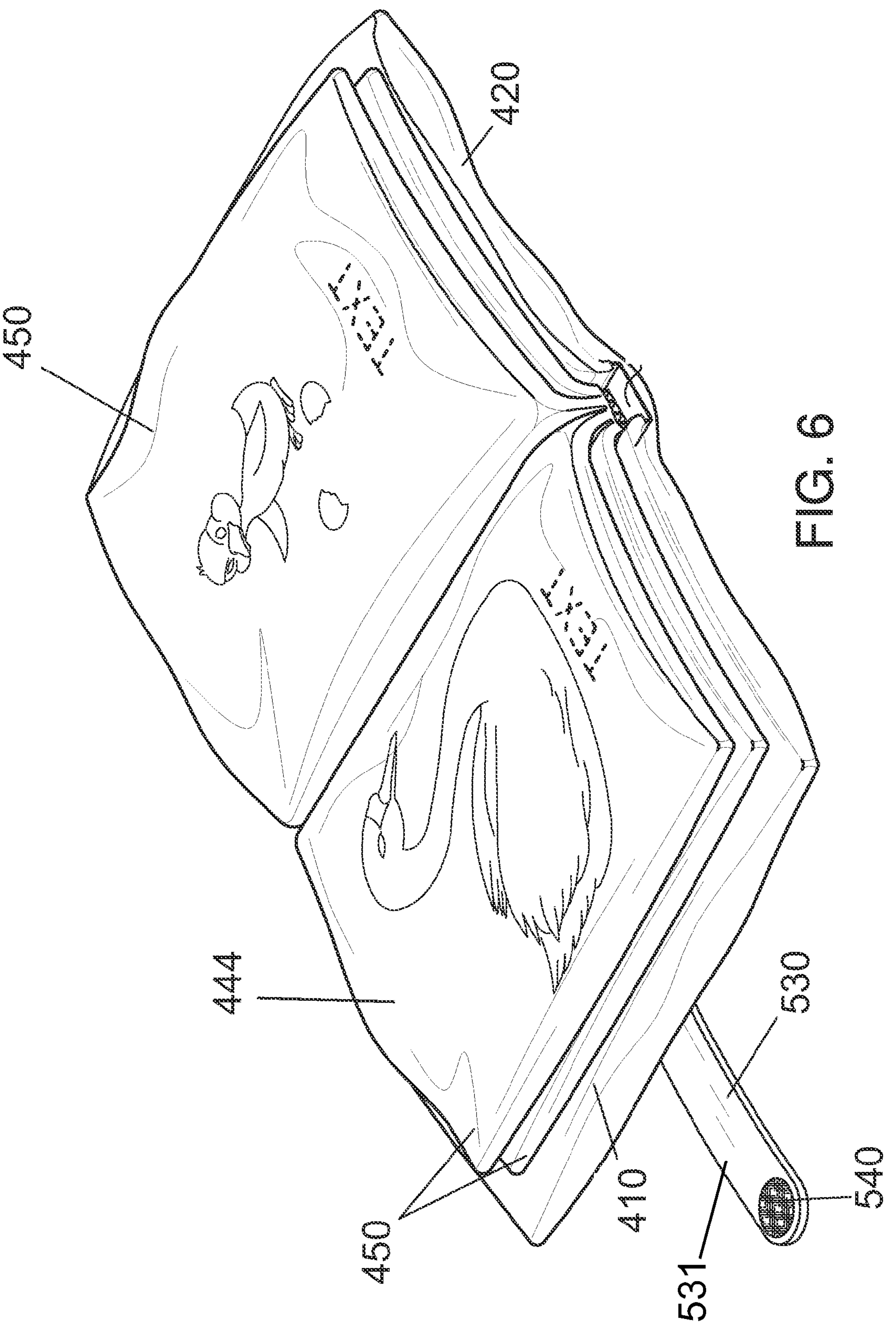
FIG. 6 is a view of an alternate embodiment of the present invention.

510 Book sheath data interface component
520 Spine attachment means
530 Closure tab
532 Closure tab first end
534 Closure tab second end
540 Attachment means first side
550 Attachment means second side
560 Blanket
570 Padding
580 Story content Referring now to FIG. 1-6, the present invention features an interchangeable story pillow book system (100) of sufficient thickness, smoothness, and softness for sleeping. In some embodiments, the system (100) has a function for recorded or prerecorded audio content playback.

In some embodiments, the system (100) comprises a book core structure (200) with a spine member (210) having a spine front cover edge (212), a spine back cover edge (214), and a spine interior surface (216). In some embodiments, the book core structure (200) comprises a front cover member (220) having a front cover attachment edge (222), and a front cover free edge (224). In some embodiments, the front cover attachment edge (222) is located on a spine front cover edge (212). In some embodiments, the book core structure (200) comprises a back cover member (230) having a back cover attachment edge (232), and a back cover free edge (234). In some embodiments, the back cover attachment edge (232) is located on a spine back cover edge (214).

In some embodiments, the book core structure (200) comprises a first page member (240) having a first page attachment edge (242), and a first page free edge (244). In some embodiments, the first page attachment edge (242) is located on the spine interior surface (216). In some embodiments, the book core structure (200) comprises a second page member (250) having a second page attachment edge (252), and a second page free edge (254). In some embodiments, the second page attachment edge (252) is located on the spine interior surface (216). In some embodiments, the book core structure (200) resembles a book having pages.

In some embodiments, the system comprises an audio recording and output system (300) having a microprocessor (310) located on the book core structure (200). In some embodiments the audio recording and output system (300) comprises a speaker (320) located on the book core structure (200). In some embodiments, the speaker (320) is operatively connected to the microprocessor (310). In some embodiments the audio recording and output system (300) comprises a microphone (330) located on the book core structure (200). In some embodiments, the microphone (330) is operatively connected to the microprocessor (310). In some embodiments the audio recording and output system (300) comprises a data storage component (340) located on the book core structure (200). In some embodiments, the data storage component (340) is operatively connected to the microprocessor (310). In some embodiments the audio recording and output system (300) comprises a plurality of activation switches (350) operatively connected to the microprocessor (310). In some embodiments the audio recording and output system (300) comprises a power source (360) located on the book core structure (200). In some embodiments, the power source (360) is operatively connected to the microprocessor (310). In some embodiments the audio recording and output system (300) comprises a data interface component (370) located on the book core structure (200). In some embodiments, the data interface component (370) is operatively connected to the microprocessor (310).

In some embodiments, the system comprises a changeable, padded multi-page book sheath (400). In some embodiments, the book sheath (400) comprises a front cover sheath (410) having a front cover sheath front surface (412) comprising padding (570) located beneath it and story content (580) printed on it. In some embodiments, the book sheath (400) comprises a front cover sheath back surface (414) comprising padding (570) located beneath it and story content (580) printed on it, and a front cover sheath attachment edge (416). In some embodiments, the book sheath (400) comprises a back cover sheath (420) having a back cover sheath front surface (422) comprising padding (570) located beneath it and story content (580) printed on it. In some embodiments, the book sheath (400) comprises a back cover sheath back surface (424) comprising padding (570) located beneath it and story content (580) printed on it, and a back cover sheath attachment edge (426).

In some embodiments, the book sheath (400) comprises a first page sheath (430) having a first page sheath front surface (432) comprising padding (570) located beneath it and story content (580) printed on it. In some embodiments, the book sheath (400) comprises a first page sheath back surface (434) comprising padding (570) located beneath it and story content (580) printed on it, and a first page sheath attachment edge (436). In some embodiments, the book sheath (400) comprises a second page sheath (440) having a second page sheath front surface (442) comprising padding (570) located beneath it and story content (580) printed on it. In some embodiments, the book sheath (400) comprises a second page sheath back surface (444) comprising padding (570) located beneath it and story content (580) printed on it, and a second page sheath attachment edge (446).

In some embodiments, the padding (570) is constructed from a foam. In some embodiments, the padding (570) is constructed from a batting material. In some embodiments, the padding (570) is constructed from a polyester.

In some embodiments, the front cover sheath attachment edge (416), the back cover sheath attachment edge (426), the first page sheath attachment edge (436), and the second page sheath attachment edge (446) are attached together.

In some embodiments, the book sheath comprises a book sheath data storage component (500) located at an intersection of the front cover sheath attachment edge (416), the back cover sheath attachment edge (426), the first page sheath attachment edge (436) and the second page sheath attachment edge (446). In some embodiments, the book sheath data storage component (500) is operatively connected to a book sheath data interface component (510). In some embodiments, the book sheath data interface component (510) is located at an intersection of the front cover sheath attachment edge (416), the back cover sheath attachment edge (426), the first page sheath attachment edge (436) and the second page sheath attachment edge (446).

In some embodiments, the book sheath (400) is inserted over and onto the book core structure (200). In some embodiments, the front cover member (220) is inserted into and slides into the front cover sheath (410). In some embodiments, the back cover member (230) is inserted into and slides into the back cover sheath (420). In some embodiments, the first page member (240) is inserted into and slides into the first page sheath (430). In some embodiments, the second page member (250) is inserted into and slides into the second page sheath (440).

In some embodiments, the book sheath (400) is held into place by a spine attachment means (520) located on the front cover sheath front surface (412) and the back cover sheath back surface (424). In some embodiments, the spine attachment means (520) comprises one or more snaps. In some embodiments, the spine attachment means (520) comprises a zipper. In some embodiments, the spine attachment means (520) comprises a plastic zip seal mechanism, for example similar to a sandwich or freezer bag. In some embodiments, the spine attachment means (520) attaches the front cover sheath front surface (412) to the back cover sheath back surface (424).

In some embodiments, the book sheath data interface component (510) operatively attaches to a data interface component (370) upon installation of the book sheath (400).

In some embodiments, the book sheath comprises a closure tab (530) having a free closure tab first end (532) and a closure tab second end (534) located on the back cover free edge (234). In some embodiments, the book sheath comprises a closure tab (530) having a free closure tab first end (532) and a closure tab second end (534) located on the front cover free edge (224). In some embodiments, the closure tab first end (532) comprises an attachment means first side (540) located on it. In some embodiments, the front cover sheath front surface (412) comprises an attachment means second side (550) located on it. In some embodiments, the front cover sheath back surface (414) comprises an attachment means second side (550) located on it. In some embodiments, upon closing the pillow book system (100), the attachment means first side (540) attaches to the attachment means second side (550).

In some embodiments, the closure tab (530) comprises the plurality of activation switches (350) located on it. In some embodiments, there is only one activation switch (350). In some embodiments, there are two activation switches (350). In some embodiments, there are three activation switches (350). In some embodiments, there are more than three activation switches (350). In some embodiments, upon operation of the activation switch (350), a sound can be recorded via the microphone (330) and stored via the data storage component (340). In some embodiments, upon operation of the activation switch (350), a sound stored via the data storage component (340) can be played back via the speaker (320). In some embodiments, upon operation of the activation switch (350), a sound stored via the book sheath data storage component (500) can be played back via the speaker (320). In some embodiments, upon operation of the activation switch (350), a prerecorded narrative stored via the data storage component (340) can be played back via the speaker (320). In some embodiments, upon operation of the activation switch (350), a prerecorded musical tune stored via the data storage component (340) can be played back via the speaker (320).

In some embodiments, the book core structure (200) comprises a plurality of page members (260). In some embodiments, the book sheath (400) comprises a plurality of page sheaths (450).

In some embodiments, the pillow book system (100) comprises a blanket (560) located on the book sheath (400). In some embodiments, the blanket (560) can be removed from the book sheath (400) by unzipping a closure. In some embodiments, the blanket (560) is attached to the book sheath (400).

In some embodiments, the book sheath (400) is constructed from a satin weave fabric. In some embodiments, the book sheath (400) is constructed from a soft fabric. In some embodiments, the book sheath (400) is constructed from a polyester or a cotton material.

In some embodiments, the interchangeable story pillow book system (100) when closed comprises a shape resembling a rectangle. In some embodiments, the interchangeable story pillow book system (100) when closed comprises a shape resembling a circle. In some embodiments, the interchangeable story pillow book system (100) when closed comprises a geometric shape, for example, a heart or a shape that resembles an outer periphery of a known item such as an animal, a character, a vehicle or a building.

In some embodiments, the power source (360) is a battery.

In some embodiments, the book core structure (200) is constructed from a rigid material. In some embodiments, the book core structure (200) is constructed from a semi-rigid material. In some embodiments, the book core structure (200) is constructed from a flexible material.

In some embodiments, the interchangeable story pillow book system (100) is about 24" wide when fully open. In some embodiments, the interchangeable story pillow book system (100) is greater than about 24" wide when fully open. In some embodiments, the interchangeable story pillow book system (100) is smaller than about 24" wide when fully open.

In some embodiments, the interchangeable story pillow book system (100) is about 12" high when fully open. In some embodiments, the interchangeable story pillow book system (100) is greater than about 12" high when fully open. In some embodiments, the interchangeable story pillow book system (100) is smaller than about 12" high when fully open.

In some embodiments, the interchangeable story pillow book system (100) is about 4" thick when fully open. In some embodiments, the interchangeable story pillow book system (100) is greater than about 4" thick when fully open. In some embodiments, the interchangeable story pillow book system (100) is smaller than about 4" thick when fully open.

As used herein, the term "about" refers to plus or minus 10% of the referenced number. For example, an embodiment wherein the book core structure is about 10 inches in length includes a book core structure that is between 9 and 11 inches in length.

The disclosures of the following U.S. Patents are incorporated in their entirety by reference herein: U.S. Pat. No. D 551,704; U.S. Pat. No. 7,486,197; U.S. Pat. No. 7,380,298; U.S. Pat. No. 6,513,164; U.S. Pat. No. 5,819,346; U.S. Pat. No. 5,765,245; U.S. Pat. No. 5,713,741; U.S. Pat. No. 5,538,430; U.S. Pat. No. 4,874,340; and U.S. Pat. No. 4,853,994.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A story pillow book system (100) of sufficient thickness, smoothness, and softness for sleeping, having recorded or prerecorded audio content playback, said system (100) consisting of:

(a) a rigid book core structure (200) consisting of:

(i) a spine member (210) having a spine front cover edge (212), a spine back cover edge (214), and a spine interior surface (216), (ii) a front cover member (220) having a front cover attachment edge (222), and a front cover free edge (224), wherein the front cover attachment edge (222) is disposed on a spine front cover edge (212), (iii) a back cover member (230) having a back cover attachment edge (232), and a back cover free edge (234), wherein the back cover attachment edge (232) is disposed on a spine back cover edge (214), (iv) a first page member (240) having a first page attachment edge (242), and a first page free edge (244), wherein the first page attachment edge (242) is disposed on the spine interior surface (216), and (v) a second page member (250) having a second page attachment edge (252), and a second page free edge (254), wherein the second page attachment edge (252) is disposed on the spine interior surface (216), structure (200) resembles a book having pages;

(b) an audio recording and output system (300) consisting of:

(i) a microprocessor (310) disposed on the book core structure (200), (ii) a speaker (320) disposed on the book core structure (200), wherein the speaker (320) is operatively connected to the microprocessor (310), (iii) a microphone (330) disposed on the book core structure (200), wherein the microphone (330) is operatively connected to the microprocessor (310), (iv) a data storage component (340) disposed on the book core structure (200), wherein the data storage component (340) is operatively connected to the microprocessor (310), (v) a plurality of activation switches (350) operatively connected to the microprocessor (310), (vi) a power source (360) disposed on the book core structure (200), wherein the power source (360) is operatively connected to the microprocessor (310), and (vii) a data interface component (370) disposed on the book core structure (200), wherein the data interface component (370) is operatively connected to the microprocessor (310);

(c) a changeable, padded multi-page book sheath (400) consisting of:

(i) a front cover sheath (410) having a front cover sheath from surface (412) consisting of padding (570) disposed beneath and story content (580) primed thereon, a front cover sheath back surface (414) consisting of padding (570) disposed beneath and story content (580) primed thereon, and a front cover sheath attachment edge (416), (ii) a back cover sheath (420) having a back cover sheath from surface (422) consisting of padding (570) disposed beneath and story content (580) primed thereon, a back cover sheath back surface (424) consisting of padding (570) disposed beneath and story content (580) primed thereon, and a back cover sheath attachment edge (426), (iii) a first page sheath (430) having a first page sheath from surface (432) consisting of padding (570) disposed beneath and story content (580) primed thereon, a first page sheath back surface (434) consisting of padding (570) disposed beneath and story content (580) primed thereon, and a first page sheath attachment edge (436), (iv) a second page sheath (440) having a second page sheath from surface (442) consisting of padding (570) disposed beneath and story content (580) primed thereon, a second page sheath back surface (444) consisting of padding (570) disposed beneath and story content (580) primed thereon, and a second page sheath attachment edge (446), wherein the front cover sheath attachment edge (416), the back cover sheath attachment edge (426), the first page sheath attachment edge (436), and the second page sheath attachment edge (446) are attached together, and (v) a book sheath data storage component (500) disposed at an intersection of the front cover sheath attachment edge (416), the back cover sheath attachment edge (426), the first page sheath attachment edge (436) and the second page sheath attachment edge (446), wherein the book sheath data storage component (500) is operatively connected to a book sheath data interface component (510), wherein the book sheath data interface component (510) is disposed at an intersection of the front cover sheath attachment edge (416), the back cover sheath attachment edge (426), the first page sheath attachment edge (436) and the second page sheath attachment edge (446), wherein the book sheath (400) is disposed over and onto the book core structure (200), wherein the front cover member (220) insertably slides into the front cover sheath (410), wherein the back cover member (230) insertably slides into the back cover sheath (420), wherein the first page member (240) insertably slides into the first page sheath (430), wherein the second page member (250) insertably slides into the second page sheath (440), wherein the book sheath (400) is held into place by a spine attachment means (520) disposed on the front cover sheath from surface (412) and the back cover sheath back surface (424), wherein the book sheath data interface component (510) operatively attaches to a data interface component (370) upon installation of the book sheath (400); and (d) a closure tab (530) having a closure tab interior surface (531), a closure tab exterior surface (533), a free closure tab first end (532) and a closure tab second end (534) disposed on the back cover free edge (234), wherein the closure tab first end (532) consists of an attachment means first side (540) disposed on the closure tab interior surface (531), wherein the front cover sheath from surface (412) consists of an attachment means second side (550) disposed thereon, wherein upon closing the pillow book system (100), the attachment means first side (540) attaches to the attachment means second side (550), wherein the plurality of activation switches (350) are disposed on the closure tab outer surface (533), whereupon attaching the attachment means first side (540) to the attachment means second side (550) to close the pillow book system (100), wherein the closure tab (530) consists of the plurality of activation switches (350) disposed thereon, wherein upon operation of the activation switch (350), a sound can be recorded via the microphone (330) and stored via the data storage component (340), wherein upon operation of the activation switch (350), a sound stored via the data storage component (340) can be played back via the speaker (320), wherein upon operation of the activation switch (350), a sound stored via the book sheath data storage component (500) can be played back via the speaker (320), wherein upon operation of the activation switch (350), a prerecorded narrative stored via the data storage component (340) can be played back via the speaker (320), wherein upon operation of the activation switch (350), a prerecorded musical tune stored via the data storage component (340) can be played back via the speaker (320).

* * * * *